United States Patent [19]

Owen

[11] 3,952,874

[45] Apr. 27, 1976

[54] MAIL PROCESSING EQUIPMENT

[75] Inventor: Trevor Wynne Owen, Mississauga, Canada

[73] Assignee: Owen Tri-Cut Limited, Mississauga, Canada

[22] Filed: Jan. 8, 1975

[21] Appl. No.: 539,489

[52] U.S. Cl. .................. 209/73; 209/125; 209/DIG. 1; 198/21; 198/179; 198/238; 214/11 R; 271/225

[51] Int. Cl.[2] .................. B65G 47/24

[58] Field of Search .................. 209/73, 125, DIG. 1; 221/66; 271/34, 10, 277, 225; 198/31 R, 31 AB, 31 AC, 179, DIG. 16, 131, 133, 21, 235, 238, 240; 214/11 R

[56] References Cited

UNITED STATES PATENTS

| | | | |
|---|---|---|---|
| 3,159,396 | 12/1964 | Barber | 271/34 |
| 3,219,204 | 11/1965 | Sassen et al. | 214/11 R |
| 3,411,768 | 11/1968 | Gatti | 271/10 |
| 3,747,737 | 7/1973 | Brooke | 198/179 X |

*Primary Examiner*—Robert B. Reeves
*Assistant Examiner*—Joseph J. Rolla

[57] ABSTRACT

The invention provides mail processing equipment which receives opened items of mail for moving these items individually past several stations. Each item is first gripped in a mail carrier which moves longitudinally and which is rotated as it moves to take up a position in which the carrier and item of mail face transversely. Once the rotation is completed the item is released for ready removal as it passes the station. A mail transporter is also provided to carry items of mail individually past the stations and which returns the items to these stations for a second pass in the event that the items are not removed at the first pass. After the envelope has had the contents removed, the envelope is handled automatically in an envelope transporter but is available to the operator until such time as a further envelope is entered into the envelope transporter. Consequently, if there is difficulty with the contents of a particular envelope, the operator can retrieve the envelope for further use. A station isolation control is also provided so that in the event that a particular station is not to receive further items of mail the control can be operated so that the transporter will not carry any more items of mail to that station.

6 Claims, 13 Drawing Figures

MAIL PROCESSING EQUIPMENT

This invention relates to mail processing equipment of a type which receives items of mail consisting of pre-opened envelopes and their contents and which delivers these items of mail individuallly to stations where the operators remove the items and then separate the contents from the envelopes.

In some businesses, many items of mail are received in large quantities and the envelopes used are all of the same size. These items of mail are processed by first passing them through a machine which automatically slits the envelopes on three sides to expose the contents, and then the contents are removed from the envelopes. Preferably, the opened items of mail should be presented to an operator in a condition in which it is easy to remove the contents. Also in many instances it is necessary to retain the empty envelope temporarily until the operator is satisfied that the envelope is no longer required.

At the present time, equipment is available for handling large quantities of mail where the envelopes are all of the same size. This equipment uses a conveyor to transport individual items of mail past work stations where operators remove the contents from the envelopes, leaving the envelopes to be carried to the end of the conveyor. It is common to use four such stations with a fifth person at the end of the conveyor to process those items which were not processed at the four stations and to check that the envelopes are no longer required. The intent of such equipment is primarily to hold the envelopes open to facilitate removal of the contents without handling the envelopes. Consequently, if an operator at one of the stations finds that an envelope is required then that envelope must be traced. Such a procedure is both inefficient and expensive. By contrast the present equipment presents the item so that the item can be removed and the envelope and contents separated in one practiced movement.

In one of its aspects, the present invention provides mail processing equipment which receives opened items of mail for moving these items individually past several stations. Each item is first gripped in a mail carrier which moves longitudinally and which is rotated as it moves to take up a position in which the carrier and item of mail face transversely. Once the rotation is completed the item is released for ready removal as it passes the station.

In another aspect, mail processing equipment is provided consisting of a mail transporter which carries items of mail individually past several stations and which returns the items to these stations for a second pass in the event that the items are not removed at the first pass.

In a third aspect, an envelope transporter is provided at each station of mail processing equipment so that after an envelope has had the contents removed, the envelope is handled automatically but is available to the operator until such time as a further envelope is entered into the envelope transporter. Consequently, if there is difficulty with the contents of a particular envelope, the operator can retrieve the envelope for further use.

In yet another aspect, mail processing equipment is provided having a plurality of stations and a mail transporter which presents items of mail to each station. A station isolation control is provided for use in the event that a particular station is not to receive further items of mail. Once the control is actuated for a station, the transporter will not carry any more items of mail to that station.

These and other aspects of the invention will be better understood with reference to the drawings, in which.

Figure 1:
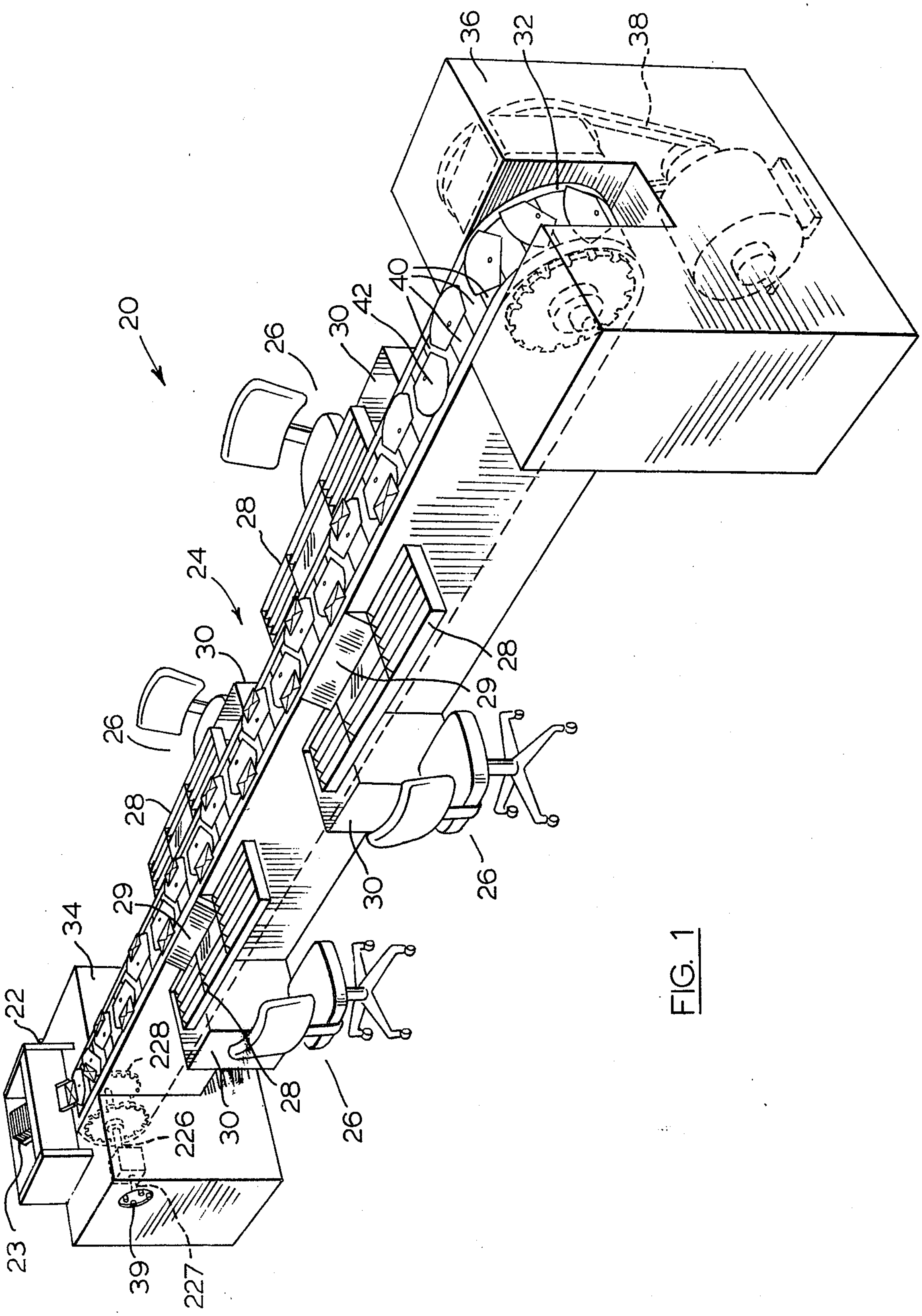
FIG. 1 is a simplified perspective view of a preferred embodiment of mail processing equipment according to the invention.

Reference is made initially to FIG. 1 to describe the essentials of mail processing equipment designated generally by the numeral 20. Mail is fed into the equipment via a mail feeder 22 which moves individual items of mail from a storage tray 23 onto a mail transporter indicated generally by the numeral 24. This transporter distributes items of mail to four stations 26. Operators at these stations remove the items of mail from the transporter 24 and place the contents from each envelope in a respective one of four sorting trays 28. The empty envelopes are placed in envelope transporters 29 (two of which are seen). Each transporter can retain an envelope for retrieval until another envelope is entered into the envelope transporter. This will be described in more detail with reference to FIGS. 8 to 10. Empty envelopes from the transporters 29 are received in waste bins 30.

The mail transporter 24 includes a closed loop apron conveyor 32 carried on respective first and second end assemblies 34, 36 and powered by a drive assembly 38 in the end assembly 36. A station isolation control 39 is coupled to the apron conveyor and is operable to stop the feeding of items of mail from the mail feeder 22 to the station which is isolated. The station isolation control will be described in greater detail with reference to FIGS. 12 and 13.

The apron conveyor 32 includes a plurality of aprons 40, and every other one of the aprons has one of a plurality of mail carriers 42 coupled to its outer surface. The carriers 42 receive individual items of mail from the feeder 22 and carry these items longitudinally past the stations 26. If a particular item is not removed at any of the stations, then the associated carrier 42 transports this item through the end assembly 36 and then by way of the other end assembly 34 onto the top of the conveyor to again bring the item past operatives at the stations. As will be described, this mail carrier may then have two items as it passes the station for the second time.

It will also be seen in FIG. 1, that each of the mail carriers 42 faces a longitudinal direction when receiving an item of mail from the feeder 22. Alternate mail carriers 42 are then rotated in opposite directions so that every other mail carrier faces the same side of the transporter 24. This rotation facilitates removing the items of mail from the carriers because a person sitting at one of the stations has items meant to be processed at that station presented towards the station. The mail carriers 42 and stations 26 are colour coded so that an operator at a particular station can identify which items of mail are to be processed at that station. As the mail carriers approach the end assembly 36 they are again aligned with the longitudinal direction of travel and remain in this condition until they again pass the feeder 22.

A detailed description of the operation of the equipment 20 will follow description of individual parts of the equipment. The mail transporter 24 will first be described with reference to FIGS. 2, 3 and 4, and with particular reference initially to FIG. 2.

The mail transporter 24 includes a pair of channel guides 44, 46 which extend in parallel relationship to define a path for guiding respective rollers 48, 50 of the apron conveyor 32. The guides 44, 46 are attached to the main frame 52 of the transporter 24 and respective linings 52, 54 are used for their sound deadening qualities. The chains 49, 50 are similar but arranged oppositely. The elements of chain 49 will be described as typical of both chains.

Chain 49 includes staggered outer links 56 arranged in conventional fashion between the rollers 48, and supporting inner links 58 separated by intermediate inner links 60. Each of the supporting inner links 58 includes a cranked upward extension 62 extending inwardly and defining threaded openings 64 for receiving screws 66. Each apron 40 is held on the chains 49, 51 by two pairs of these screws. Transverse edges of the apron 40 are curved to allow the aprons to run adjacent one another when the aprons are coplanar and yet to permit the aprons to move into positions at an angle to one another as the aprons follow curved paths in the respective end assemblies 34, 36 (FIG. 1).

As previously described, every other apron 40 carries a mail carrier 42. Such a carrier is shown in FIG. 2 in a position preparatory to receiving an item of mail shown in ghost outline.

Figure 2:
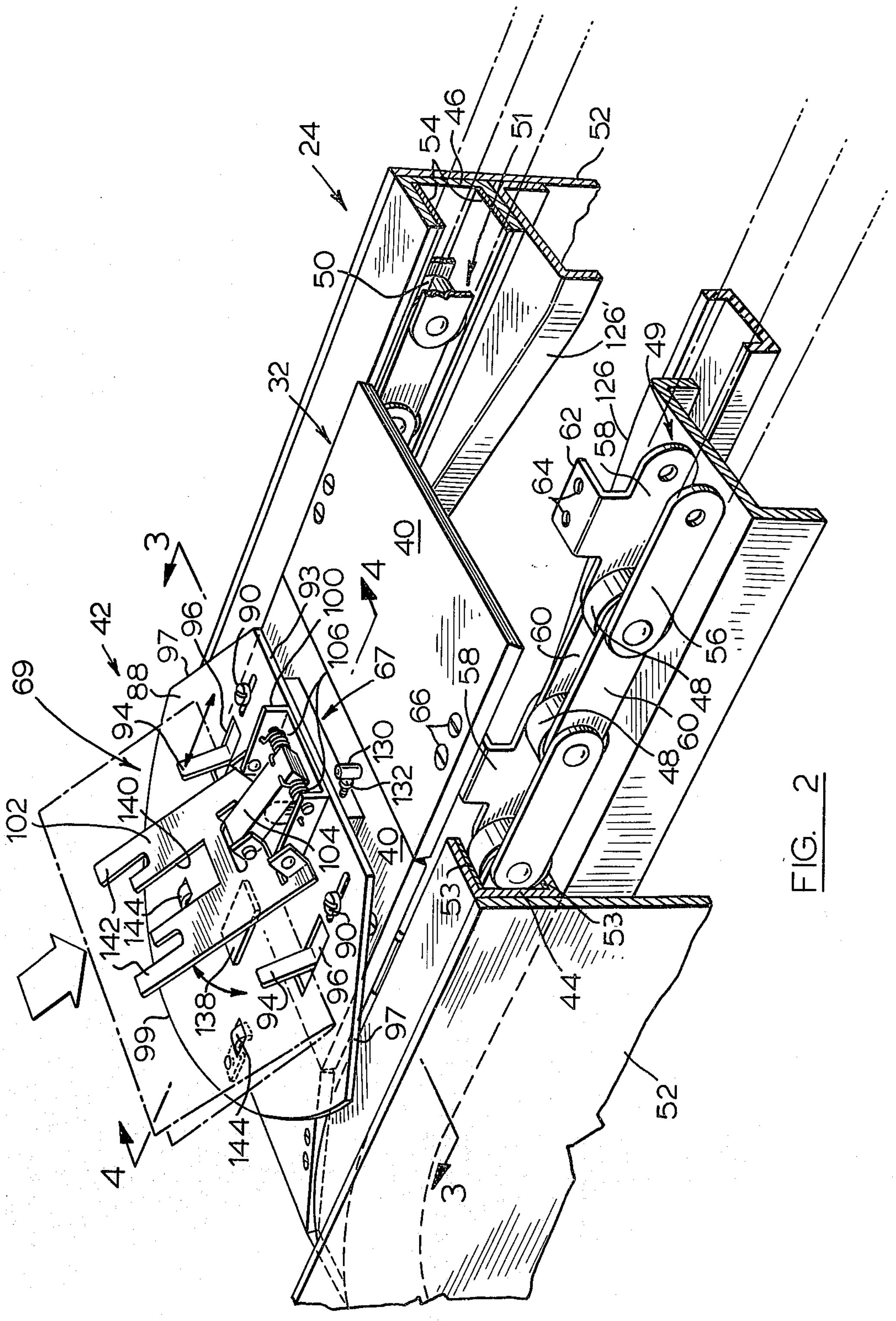
FIG. 2 is a perspective view of a portion of an apron conveyor used in the equipment and showing a mail carrier mounted on the conveyor.
Figure 3:
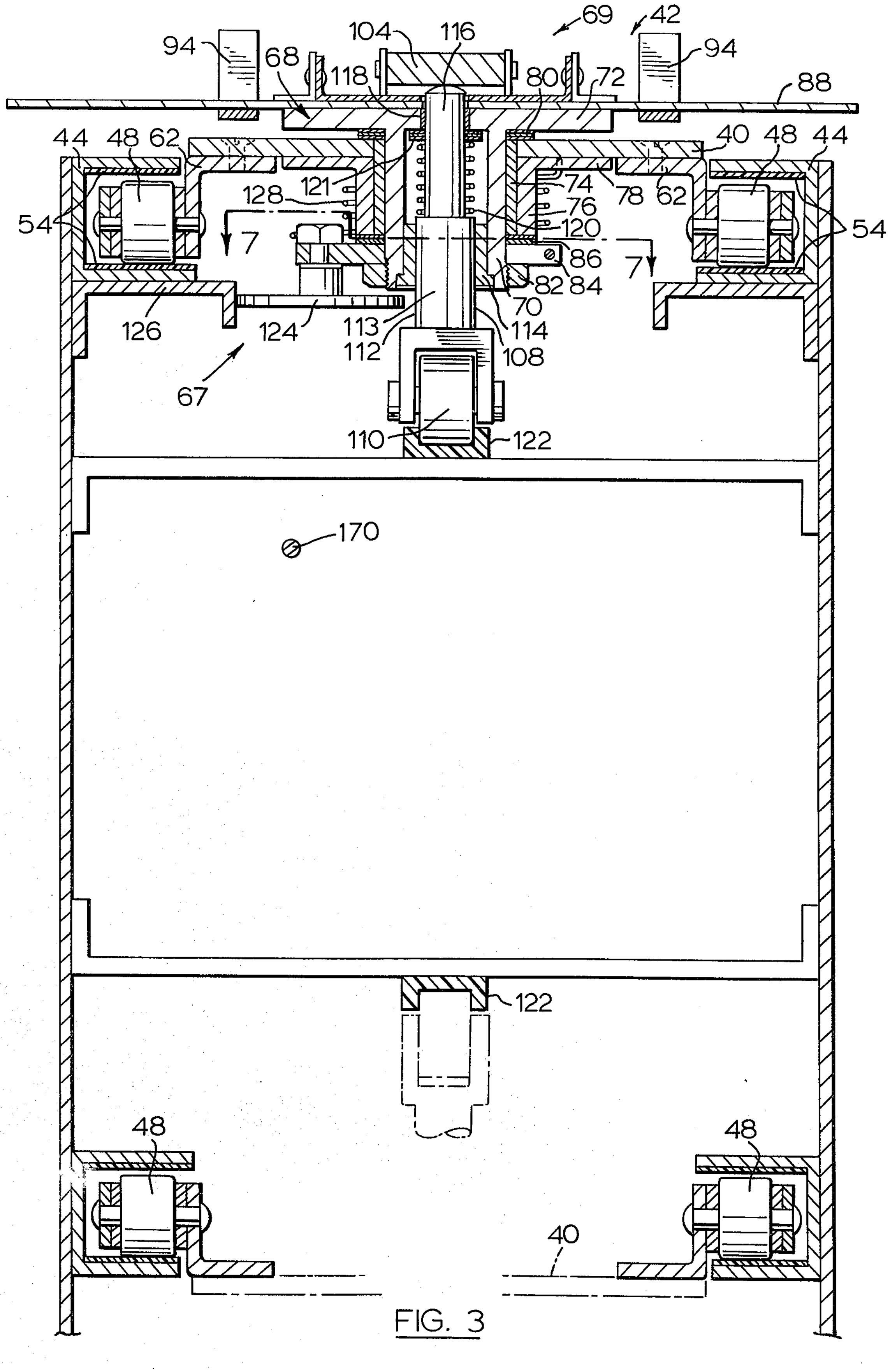
FIG. 3 is a transverse sectional view on line 3—3 of FIG. 2.
Figure 4:
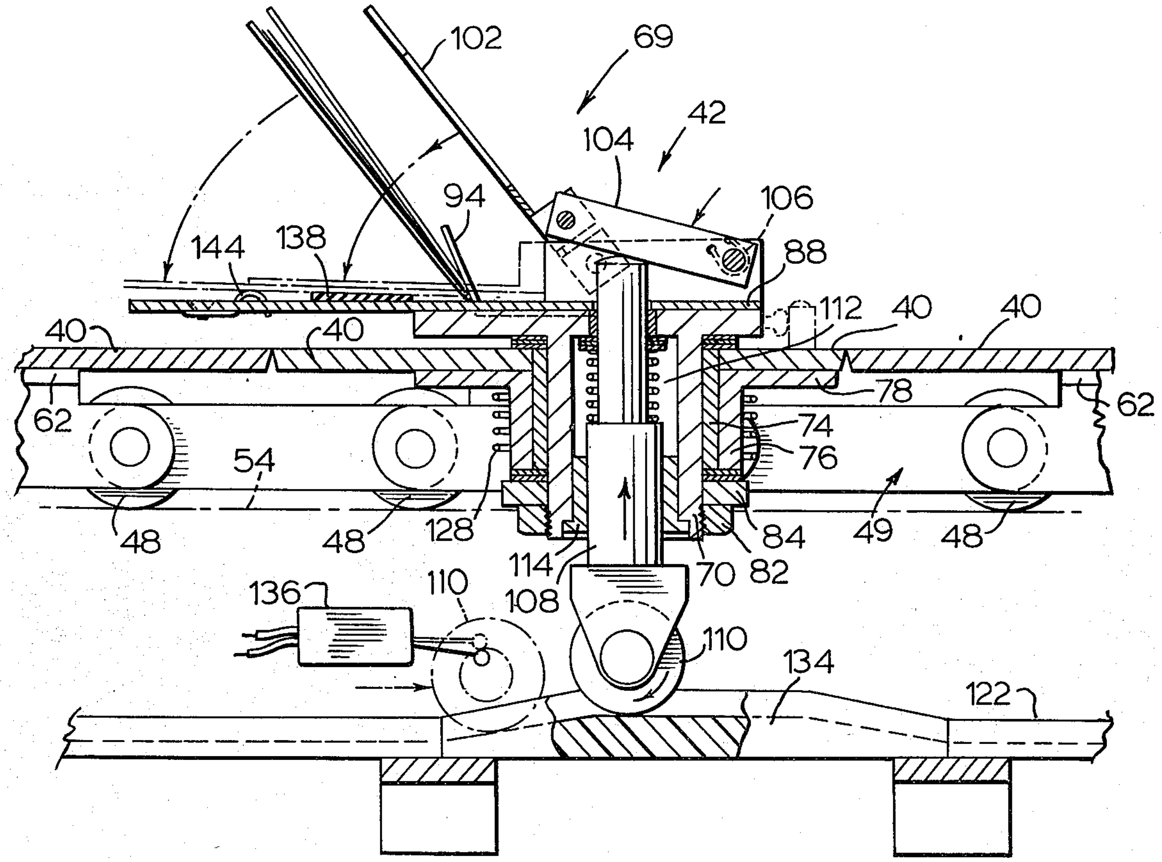
FIG. 4 is a longitudinal sectional view on line 4—4 of FIG. 2.

As seen in FIGS. 2 and 3, the mail carrier 42 sits on a rotation mechanism 67 and includes a gripper mechanism 69. The rotation mechanism includes a rotatable support piece 68 having a vertical cylindrical portion 70 from which an integral upper flange 72 is dependent. The cylindrical portion 70 is located for rotation about a vertical axis in a journal bearing 74 housed in a casing 76 which is attached to the underside of saddle 40 by an integral flange 78. The support piece 68 rests on a simple thrust bearing 80 located between the flange 72 and the periphery of an opening in the apron 40 and is retained against upward vertical motion by a ring-nut 82 threaded on a lower end of the cylindrical portion 70. This nut retains an adjustable cam follower support 84, the shape of which is better seen in FIG. 5. The adjustment of this support will be described subsequently when describing how the mail carrier 42 rotates as previously mentioned with reference to FIG. 1. The upper surface of the cam follower support 84 bears against a thrust bearing 86 located at the lower extremity of the casing 76.

The flange 72 of the support piece 68 carries a mail support plate 88 which rotates with the support piece 68. This support plate is better seen in FIG. 2 where it will be seen that the plate has a transverse leading edge 93, a pair of diverging side edges 97, and a convex trailing edge 99. It will be evident from FIG. 1 that the shape of plates 88 is such that they provide a maximum support surface for items of mail while ensuring that there is no interference between adjacent plates when the mail carriers 42 rotate.

A pair of location fingers 94 project upwardly through respective slots 96 in the plate 88. These fingers are aligned with one another transversely and extend longitudinally for threadably receiving screws 90 which in turn pass through slots in the plate 88. The arrangment is such that the fingers can be adjusted longitudinally to provide greater or lesser space for items of mail depending upon the size of the items being handled.

The gripper mechanism 69 is operable to clamp an item of mail against the plate 88 after the item has been received from the mail feeder 22 (FIG. 1). FIG. 2 shows this mechanism in an open position about to receive an item of mail whereas FIG. 3 shows the mechanism in a closed position.

As seen in FIG. 2, the gripper mechanism 69 consists of a fixed element 100 attached to the plate 88 and a movable element 102 which is pivotally attached to the element 100. The elements 100, 102 are also connected to one another by an intermediate link 104 which is pivotally connected to both elements and which is biased by a pair of springs 106 to move the element 102 downwardly into a position in which mail is gripped against the support plate 88.

Figure 6:
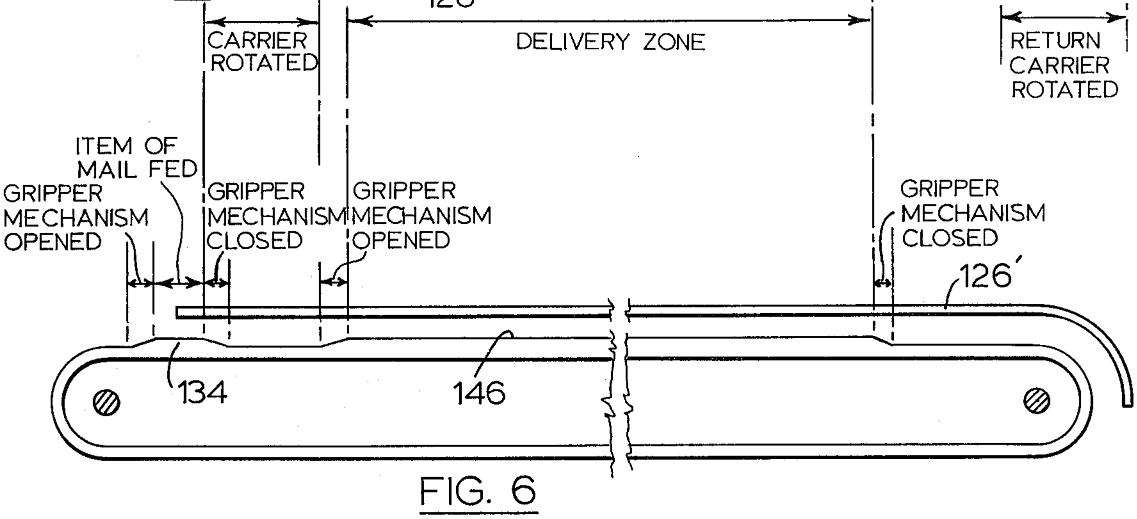
FIG. 6 is a diagrammatic side view of a cam track forming part of a gripper mechanism associated with mail carriers such as that shown in FIG. 2.

Returning to FIG. 3, the intermediate link 104 is aligned with a cam follower 108 consisting of a follower wheel 110 attached to a lower end of a stepped plunger 112. A larger cylindrical portion 113 of the plunger 112 is guided for vertical movement by a journal bearing 114 at the lower end of the cylindrical portion 70 of the support piece 68. The larger cylindrical portion 113 is integrally attached to an upper and smaller cylindrical portion 116 which in turn is guided in a journal bearing 118 within a central opening defined in flange 72 of the support piece 68. A partially compressed coil spring 120 is located about the cylindrical portion 116 and is in engagement at its respective ends with an upper end of the cylindrical portion 113 and a thrust bearing 121 at the underside of the flange 72. This spring biases the cam follower 108 downwardly into engagement with a cam track 122 which is yet to be described. However, at present it is sufficient to understand that the cam track causes the cam follower 108 to move vertically against the action of the spring 120 to thereby engage the intermediate link 104 for lifting the movable element 102 (FIG. 2) of the gripper mechanism 69. Consequently, the element can be moved into the position shown in FIG. 2 for receiving an item of mail and then allowed to return to the position shown in FIG. 3 under the action of the energy stored in spring 120. The cycle of such movement will be better described subsequently with reference to FIG. 6.

When an item of mail strikes the fingers 95 (as indicated in ghost outline in FIG. 2) the gripper mechanism 69 is activated to hold this item against the plate 88. To this end the mechanism 69 includes a pad 138 of resilient frictional material which is attached to the plate 88 so that when the movable element 102 pivots downwardly, the item of mail is forced against this pad. As best seen in FIG. 2, the element 102 is shaped with a central recess 140 which allows the element clearance about the pad 138. Also end pieces 142 are provided in alignment with curved spring elements 144 attached to the plate 88. These spring elements project slightly above this plate (see also FIG. 4), and ensure that the end pieces engage the item of mail. Further engagement is provided by the pad 138 which combines with the edges about the recess 140 in the movable element 102 to more positively lock the item of mail on the plate 88.

Figure 5:
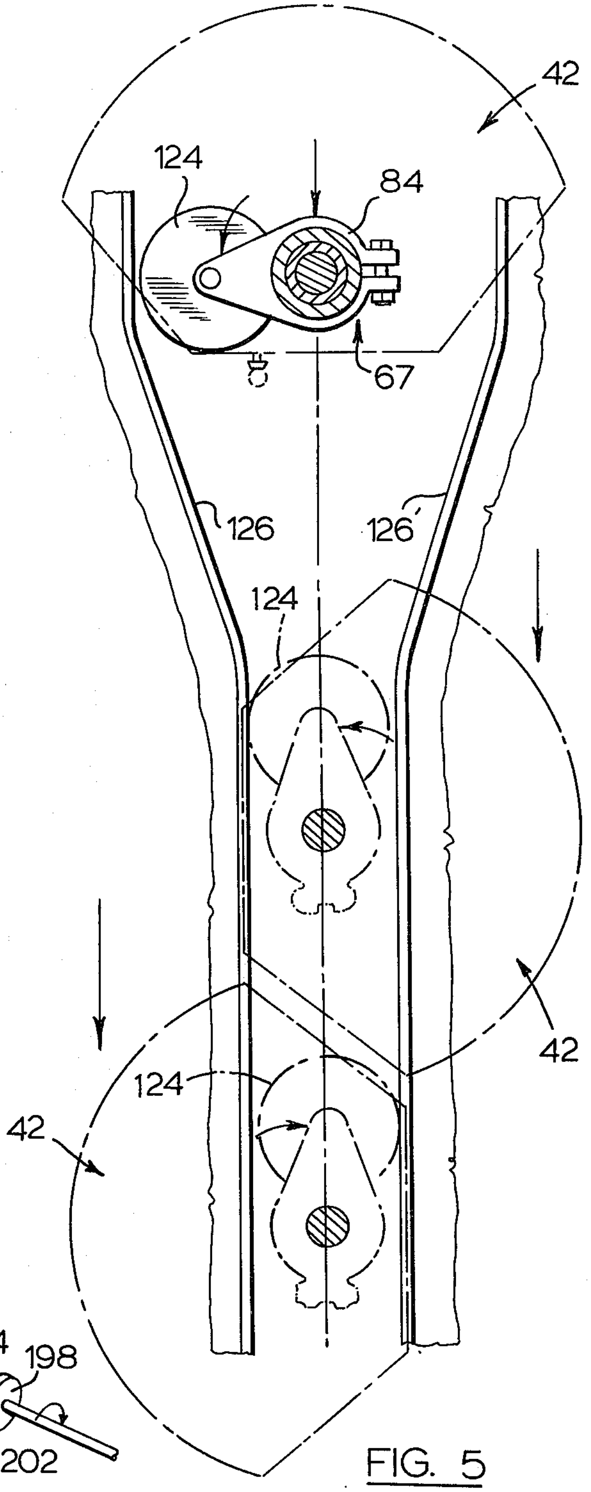
FIG. 5 is a detailed view of a portion of a rotation mechanism shown in FIG. 6 and illustrating its use.

It will be appreciated from the foregoing description that the mail carrier 42 is turned by rotation mechanism 67. The control of the rotation of carrier 42 will now be described with reference to the remainder of the mechanism 67. The cam follower support 84 is associated with a cam follower wheel 124 which is rotatably connected to the support 84. As seen in FIG. 5 this wheel co-operates with a cam track 126 to move the mail carrier 42 from the FIG. 2 position into a position where the mail carrier has moved through 90 degrees to present an item of mail to one of the stations 26 (FIG. 1) at the far side of the equipment as drawn in FIG. 1. When the wheel 124 is not in contact with the track 126 a torsion coil spring 128 which is located about the casing 76 retains the mail carrier 42 in the FIG. 2 position. A stop 130 (FIG. 2) is provided with an adjustable screw 132 for proper location of the carrier 42 under the influence of spring 128.

The various relative positions of mail carriers 42 are illustrated in FIG. 5. At the top of FIG. 5, a mail carrier 42 is in the position in which it is about to receive mail and the cam follower wheel 124 is out of contact with the cam track 126. The spring 128 (FIG. 3) is holding the mail carrier 42 in engagement with the stop 130 (FIG. 2).

Returning to FIG. 5, the intermediate position shown in FIG. 5 illustrates a carrier which is to serve the stations 26 in the background of FIG. 1. This carrier makes a clockwise rotation relative to the position shown at the top of FIG. 5 and would normally be in the position shown at the top of this figure when receiving mail. However, by simply arranging for the spring 128 to operate in an opposite direction, and by attaching the cam follower support 84 in a position at 180 degrees relative to the position shown at the top of FIG. 5, the wheel 124 combines with a corresponding cam track 126' to cause the mail carrier to move into the position shown at the foot of FIG. 5. This type of carrier would service the stations 26 in the foreground of FIG. 1.

Reference is again made to FIG. 1 to describe the operation of the equipment 20 to the point where an item of mail is placed in a position for an operator to remove the item from the mail transporter 24. Initially, items of mail are received and opened on three sides before being stacked in the feeder 22. This feeder is of conventional form and is capable of delivering discrete items of mail when an electrical demand is placed on the feeder. To this end, as the mail carriers 42 move through the end assembly 34, they are in their normal position with their respective gripper mechanisms 69 in closed positions. Consider one of the carriers 42. Before this carrier reaches a position just beyond the outlet from the mail feeder 22, the cam follower wheel 110 meets a raised portion 134 (FIGS. 4 and 6) of the cam track 122. As the cam wheel 110 begins to move upwardly on the raised portion 134, the axle carrying the wheel 110 engages a microswitch 136 (FIG. 4) which presents an electrical demand to the mail feeder 22. This demand causes an item of mail to be delivered onto the mail carrier 42. The upward movement of the cam wheel 110 has also caused the plunger 112 to move upwardly thereby pivoting the movable element 102 into an open position ready to receive the item of mail.

Figure 7:
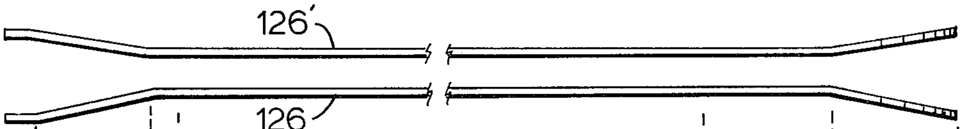
FIG. 7 is a plan view of cam tracks forming part of a rotation mechanism used to rotate mail carriers such as that shown in FIG. 2, this view being aligned for comparison with FIG. 6.

As the cam wheel 110 (FIG. 3) moves off the raised portion 134 of track 122 (FIG. 6), the gripper mechanism 69 (FIG. 2) closes on the item of mail to hold this item firmly until such time as the mail carrier 42 has been rotated into a position for serving one of the stations 26. This can be seen by comparison of FIGS. 6 and 7 which are aligned and drawn to corresponding scales. After the mail carrier 42 (FIG. 1) passes the raised portion 134 of track 122, the wheel 124 (FIG. 5) engages one of the cam tracks 126, 126' where these tracks converge. Once the carrier has been rotated by the engagement of wheel 124 on one of the tracks 126, 126' the item of mail can be unclamped ready for removal. This unclamping is done by the engagement of the wheel 110 (FIG. 3) of gripper mechanism 69 with an elongated raised portion 146 of track 122. The item of mail is then simply riding on the support plate 88 (FIG. 2) and is not clamped so that it can be removed from the mail carrier as the item passes one of the stations. Once the mail carrier has passed all of the stations, it can then return to the position it originally took relative to the longitudinal direction of the conveyor 32. This rotation is achieved after the wheel 110 (FIG. 3) rolls off the raised portion 146 and where the tracks 126, 126' diverge. Also, in the event that the item of mail was not removed, the mail carrier carries the item around the conveyor track to return the item to the original position adjacent the mail feeder 22 (FIG. 1). Here a second item of mail is added to the carrier unless the station isolation control 39 has been actuated as will be described.

It will now be understood how an item of mail reaches one of the stations shown in FIG. 1. Consider station 26 in the foreground of FIG. 1. The stations are colour coded to match corresponding colours on the mail carriers 42. Consequently, when one of the correspondingly coloured mail carriers reaches this station 26, an operator picks up the item of mail which is facing the operator in such a manner that the slit envelope reveals the contents. With practice the operator can pick up the item and remove the contents of the envelope in one movement. The empty envelope is then entered into an envelope transporter 148 while the operator ascertains from the contents whether or not the envelope is required further. The transporter 148 stores the envelope temporarily and in the event that the operator needs to again refer to the envelope, it can be withdrawn as will be described.

Figure 8:
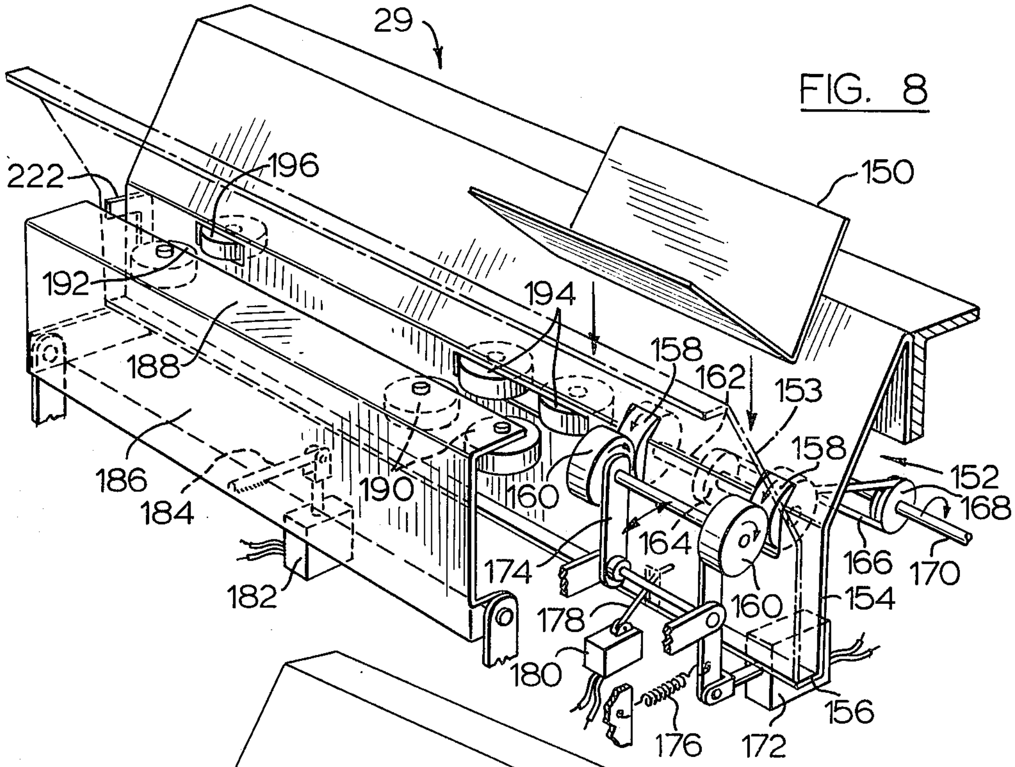
FIG. 8 is a perspective view of an envelope transporter for moving empty envelopes, the transporter being in a first position for moving an envelope vertically downwards.
Figure 9:
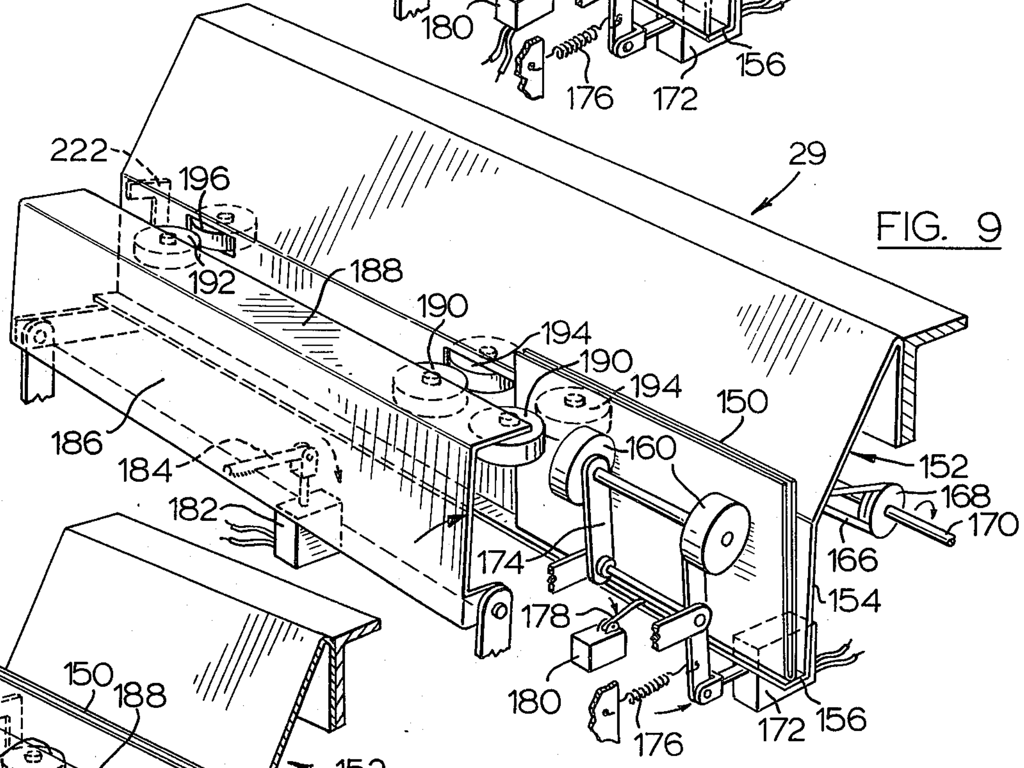
FIG. 9 is a view similar to FIG. 8 showing the envelope transporter in a position to move the envelope longitudinally.
Figure 10:
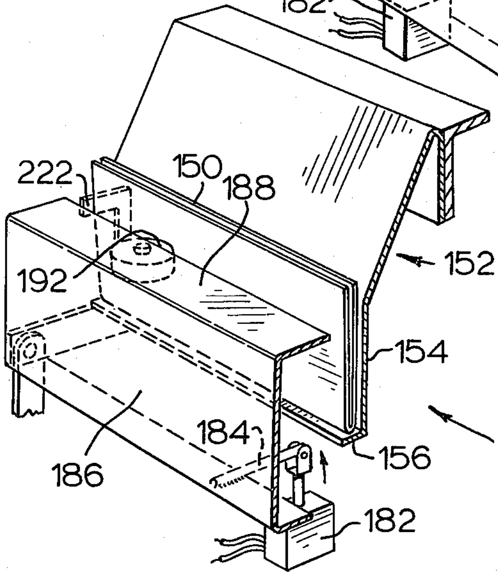
FIG. 10 is a view similar to FIGS. 8 and 9 and showing a portion of the envelope transporter in a position to stop the envelope moving longitudinally.

The envelope transporter 148 is better shown in FIGS. 8, 9 and 10. In FIG. 8, the transporter is in a position where it is about to receive an empty envelope 150 which the operator has dropped vertically into the transporter 148. Although the envelope is shown with the front and rear panels at an angle to one another, it may be that in practice they will lie substantially parallel to one another depending upon how the operator handled the envelope.

Envelope 150 is driven downwardly between an inclined backing plate 152 and a similar front plate 153 (shown in ghost outline). The plate 153 is omitted from FIGS. 9 and 10 for clarity of illustration. Plate 152 is basically typical of both plates 152, 153 and terminates at its lower extremity in a vertical portion 154 having a bottom 156 at its lower extremity. The envelope 150 is driven in a nip between a pair of driven wheels 158 and corresponding idler wheels 160. The driven wheels 158 are on a common shaft 162 and driven by a pulley wheel 164 which is connected by a belt 166 to a pulley wheel 168 on a layshaft 170. The idler wheels 160 are forced towards the driven wheels 158 by a light tension spring 176 attached to a downward extension of a pivotal frame 174 supporting the wheels 160. A solonoid 172 is also operably coupled to the frame 174 for moving the idler wheels 160 out of engagement with the envelope against the action of spring 176. When the envelope falls into engagement with the wheels 158 and 160, the envelope is driven downwardly and is consequently closed for better handling. Ultimately the downward movement is arrested when the lower extremity of the envelope strikes a lever 178 of microswitch 180. This microswitch is connected electrically to the solonoid 72 which then operates against the spring 176 to move the idler wheels 160 away from the envelope and thereby prevent any further downward drive on the envelope.

Figure 11:
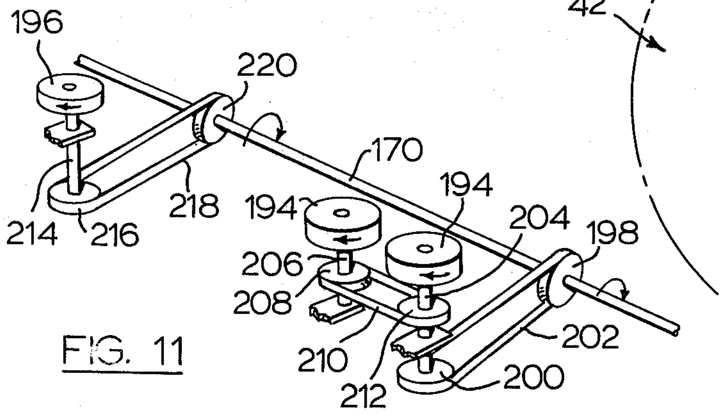
FIG. 11 is a perspective diagrammatic view of part of a drive mechanism used in the envelope transporter.

The microswitch 180 is also connected electrically to a solonoid 182 coupled to an operating arm 184 of a tilt bracket 186. This bracket is balanced to normally rest in the position shown in FIG. 8 and is pivotally mounted at its bottom. The bracket includes an upper flange 188 carrying a leading pair of idler wheels 190 and an end idler wheel 192. The idler wheels 190 and 192 rotate about respective generally vertical axes and are aligned with corresponding driven wheels 194 and 196 to form nips for driving envelopes longitudinally. Driven wheels 194, 196 are made to rotate by connection with the layshaft 170 as seen in FIG. 11. A pulley wheel 198 on the layshaft 170 drives another pulley wheel 200 by way of a belt 202. The wheel 200 is attached to a vertically extending shaft 204 to which one of the driven wheels 194 is also attached. A shaft 206 lies parallel to shaft 204 and carries the other driven wheel 194 together with a pulley wheel 208 driven by a belt 210 from a pulley 212 on the shaft 204. The arrangement is such that the wheels 194 move in a clockwise direction in plan view. Similarly, wheel 196 is arranged to move in the same direction and is attached to a shaft 214 extending vertically and having a pulley wheel 216 which is coupled by a belt 218 to a similar pulley wheel 220 on the layshaft 170.

Returning to FIG. 8, when the envelope 150 strikes the arm 178 of microswitch 180, the solonoids 172 and 182 operate to rotate the frame 174 and to tilt bracket 186 into the respective positions shown in FIG. 9. Here, the first of the driven wheels 194 combines with the corresponding idler wheel 190 to drive the envelope longitudinally. The speed of the wheels 194 is such that the envelope is accelerated firstly by the action of one of the wheels 194 and subsequently by the combined actions of both of the wheels 194. As soon as the envelope leaves the arm 178 of microswitch 180, the solonoids 172 and 182 are no longer energised so that the tilt bracket 186 rotates to move the idler wheels 190, 192 away from the driven wheels 194, 196. The accelerated envelope continues to move longitudinally but only until it reaches a position illustrated in FIG. 10 where the envelope has engaged an end stop 222 attached to the bracket 186.

The end stop 222 is out of alignment with the moving envelope when the wheels 194, 196 are driving the envelope longitudinally so that an envelope can be driven out of the end of the transporter. However the present envelope is to be retained temporarily and this is achieved by engaging the envelope against end stop 222 as shown in FIG. 10.

The envelope remains in the FIG. 10 position while the operator at the station ensures that the envelope is no longer required. Once this has been ascertained, the next envelope is dropped into the envelope transporter and consequently the switch 180 is closed. This causes the driven wheel 196 to move the first envelope out of the transporter before the tilt bracket 186 moves into the FIG. 10 position to stop the second envelope. In the event that an envelope is required by the operator it can be lifted out of the transporter from the position shown in FIG. 10.

In general, the mail transporter 24 will be operated at a speed suitable for the operators to remove every item of mail presented to them. However, in the event that an operator for some reason must stop taking such items, then the station isolation control 39 (FIG. 1) is used to isolate the station served by that operator. This control is driven from a shaft 226 associated with idler chain wheels 228 which in turn are driven by the chains 49, 51 (FIG. 2).

Figure 12:
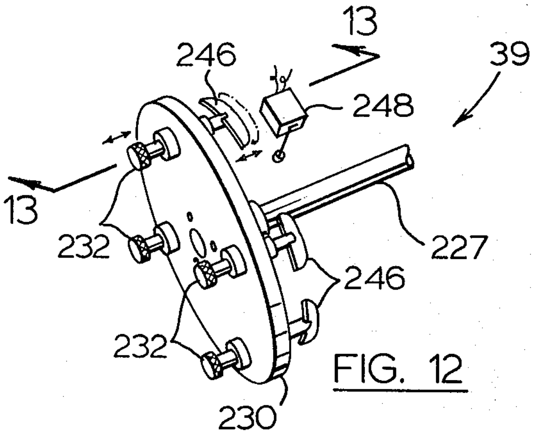
FIG. 12 is a perspective view of a station isolation control.
Figure 13:
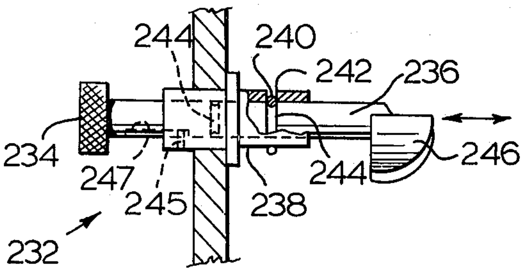
FIG. 13 is a sectional view on line 13—13 of FIG. 12.

The station isolation control 39 is shown in FIGS. 12 and 13. As seen in FIG. 12. a shaft 227 extends for attachment to a disc 230 which rotates with the shaft 227. This shaft is coupled to shaft 226 (FIG. 1) such that the shaft 227 completes one revolution while successive carriers 42 (FIG. 1) for one station pass the feeder 22 (FIG. 1). Four plunger assemblies 232 are mounted in the disc 230 for operation to isolate a particular station. Each of the plunger assemblies are similar and one of them is shown in FIG. 13 where it will be seen that the assembly 232 consists of a colour-coded control button mounted on the outer end of a spindle 236. This spindle is slidably mounted on a sleeve 238 which is frictionally engaged in the disc 30. A spring-loaded location ring 240 is engaged in a slot 242 in the sleeve 238 for combining with one of a pair of annular recesses 244 formed in the spindle and spaced-apart along the length of the spindle. A pin 245 is mounted in the sleeve 238 and is engaged in a recess 247 in spindle 236 to prevent rotation of the spindle. In the position shown in FIG. 13, the location ring 240 is engaged in an inner of the recesses 244 and this places the plunger assembly in a disengaged position. If the control button 234 is pressed, then the plunger moves inwardly until the ring 240 engages the recess 244 at which point the plunger assembly is in an engaged position. The shoe 246 is then in a position in which the shoe will engage a microswitch 248 (FIG. 12). This microswitch is normally closed to permit the passage of current and lies in the circuit between switch 136 (FIG. 4) and the feeder 22 (FIG. 1). Consequently if switch 248 is opened by one of the shoes 246 on control 39, then there will be no demand for an item of mail at the feeder 22 and a corresponding mail carrier 42 (FIG. 1) will continue empty.

In operation, the station isolation control 39 can be used to isolate the circuit containing microswitch 136 (FIG. 4) which normally presents a demand to the mail feeder 22 (FIG. 1) as previously described. This isolation is done by engaging the plunger assembly 232 corresponding to the colour of the station to be isolated so that as the disc 230 rotates, the shoe 246 on that plunger engages microswitch 248. Consequently, as described, no demand will be made in the feeder 22 (FIG. 1) and the corresponding mail carrier will go empty. This isolation of carriers will be repeated on every revolution of the disc 230 for those carriers having the same colour code as that of the plunger assembly operated at the control 39.

It will now be appreciated that the preferred embodiment described with reference to the drawings has many advantages. Firstly, at any particular station a person operating that station has the mail presented in such a manner that the mail is facing the station. Further, after the contents of an envelope have been removed the envelope is not lost unless the operator at that station decides that the envelope is no longer required. Further, if an operator misses a particular item of mail, that item will continue around the transporter 24 and be presented again together with a further item of mail. If the operators work at different speeds, it is possible for a supervisor, by use of the station isolation control 224, to allow a particular operator some catch-up time in order to process the mail which is already in the system. This is particularly advantageous for trainees. Further, if an operator is missing or must leave the work area for some reason, then the station isolation control 39 can be used to prevent mail going to that operator's station.

It will be appreciated that the invention includes several aspects and that parts of the described embodiment may be used with other equipment. For instance the envelope transporter could be used with existing equipment used to transport an item of mail to an operator's station. Consequently although a preferred embodiment has been described, the scope of the invention encompasses the use of all aspects individually of one another or in combination with one another.

I claim:

1. Mail processing equipment for use in receiving open items of mail and for presenting such items to operators positioned at either side of the mail processing equipment, the equipment comprising:

a mail feeder adapted to feed items of mail individually; and a mail transporter located adjacent the mail feeder for receiving individual items of mail from the feeder, the mail transporter including a closed loop conveyor means following a path having a top part extending from the mail feeder past the operators, individual mail carriers carried by the conveyor means, each of the mail carriers having a gripper mechanism operable to move between a closed position for holding an item of mail when the item of mail is in portions of said path not serviced directly by the operators, and an open position where this item of mail rests on the mail carrier as the carrier passes along at least a portion of said top part and is available for removal from the mail carrier by at least one of the operators, and rotation mechanisms coupling the respective mail carriers to the conveyor means and operable to rotate each of the mail carriers between a first position for receiving an item of mail moving longitudinally from the mail feeder and a second position as the mail carrier passes along said top part so that the mail carrier then lies at about 90 degrees relative to the first position whereby the item of mail is readily available to be removed transversely from the mail transporter by an operator, the mail transporter further including cam means associated with the mail carriers to control the positions of the respective gripper mechanisms and the rotation of the mail carriers so that from an initial position, where the mail carrier receives an item of mail from the mail feeder in passing the mail feeder, the associated gripper mechanism on each mail carrier is open when the mail carrier is in the first position to receive the item of mail and then closes as the mail carrier moves from the first to the second position before again opening with the mail carrier in the second position to carry the item of mail past the operators for removal by one of the operators, the cam means then causing the gripper mechanism to close and the mail carrier to return to the first position before carrying any remaining item of mail back to said initial position.

2. Mail processing equipment as claimed in claim 1 in which the mail transporter further includes a first switch means operable by each of the mail carriers to demand an item of mail from the mail feeder for placement on a corresponding one of the mail carriers, and in which each of the mail carriers is coded for identifying the carriers so that an operator at a particular station will know which of the items of mail passing that station are to be processed by that operator, the mail processing equipment further comprising a station isolation control having a plurality of coded controls corresponding to the codes on the mail carriers and to the number of stations, and a second switch means interposed between said first switch means and said mail feeder, the second switch means being operable by each of the controls individually to prevent a demand from a first switch means reaching the mail feeder so that the coded mail carriers corresponding to one of the controls will receive no items of mail when this one of the controls is engaged.

3. Mail processing equipment as claimed in claim 1 and further including an envelope transporter for use in receiving empty envelopes to store the envelopes temporarily while an operator decides whether or not the envelope can be discarded, the transporter comprising:

first drive means adapted to move the envelope downwardly towards a lowermost position and to hold the envelope in a closed condition;

switch means operable by the envelope in reaching said lowermost position to disengage the first drive means;

second drive means coupled to said switch and an end stop positioned adjacent the second drive means and being responsive to said switch, the second drive means being operable contemporaneously with the disengagement of the first drive means to accelerate the envelope longitudinally towards a storage position in which the envelope is engaged against the end stop, the consequent disengagement of the envelope and switch resulting in the first drive means being again ready to engage a second envelope and the second drive means being disengaged as the envelope moves towards the storage position, the disengagement of the second drive means resulting in the end stop becoming aligned with the envelope to stop the envelope in the storage position to allow the first mentioned envelope to remain in said storage position where this envelope remains unless the operator either removes the envelope vertically for further inspection or enters a second envelope which subsequently engages the switch means to cause the longitudinal drive means to move the first envelope out of the envelope transporter and to move the second envelope into the storage position.

4. Mail processing equipment as claimed in claim 3 in which the mail transporter further includes a first switch means operable by each of the mail carriers to demand an item of mail from the feeder for placement on a corresponding one of the mail carriers, and in which each of the mail carriers is coded for identifying the carriers so that an operator at a particular station will know which of the items of mail passing that station are to be processed by that operator, the mail processing equipment further comprising a station isolation control having a plurality of coded controls corresponding to the codes on the mail carriers and to the number of stations, and a second switch means interposed between said first switch means and said mail feeder, the second switch means being operable by each of the controls individually to prevent a demand from a first switch means reaching the mail feeder so that the coded mail carriers corresponding to one of the controls will receive no items of mail when this one of the controls is engaged.

5. An envelope transporter for use in mail processing equipment to receive empty envelopes for storing the envelopes temporarily while an operator decides whether or not the envelope can be discarded, the transporter comprising:

first drive means adapted to move the envelope downwardly towards a lowermost position and to hold the envelope in a closed condition;

switch means operable by the envelope in reaching said lowermost position to disengage the first drive means;

second drive means coupled to said switch and an end stop positioned adjacent the second drive means and being responsive to said switch, the second drive means being operable contemporaneously with the disengagement of the first drive means to accelerate the envelope longitudinally towards a storage position in which the envelope is engaged against the end stop, the consequent disengagement of the envelope and switch resulting in the first drive means being again ready to engage a second envelope and the second drive means being disengaged as the envelope moves towards the storage position, the disengagement of the second drive means resulting in the end stop becoming aligned with the envelope to stop the envelope in the storage position to allow the first mentioned envelope to remain in said storage position where this envelope remains unless the operator either removes the envelope vertically for further inspection or enters a second envelope which subsequently engages the switch means to cause the longitudinal drive means to move the first envelope out of the envelope transporter and to move the second envelope into the storage position.

6. Mail processing equipment for use in receiving opened items of mail and for presenting such items to operators, the equipment comprising:

a mail feeder adapted to feed items of mail individually;

a mail transporter located adjacent the mail feeder for receiving individual items of mail from the feeder, the mail transporter including a closed loop conveyor and a plurality of mail carriers coupled to the carrier for receiving individual items of mail from the mail feeder, the mail transporter including a first switch means operable by each of the mail carriers to demand an item of mail from the feeder for placement on a corresponding one of the mail carriers;

a plurality of stations receiving said items of mail, each of the mail carriers being coded for identifying the carriers so that an operator at a particular station will know which of the items of mail passing that station are to be processed by that operator; and a station isolation control comprising a plurality of coded controls corresponding to the codes on the mail carriers and to the number of stations, and a second switch means interposed between said first switch means and said mail feeder, the second switch means being operable by each of the controls individually to prevent a demand from the first switch means reaching the mail feeder so that the coded mail carriers corresponding to one of the controls will receive no items of mail when this one of the controls is engaged.

* * * * *

UNITED STATES PATENT OFFICE

CERTIFICATE OF CORRECTION

Patent No. 3,952,874 Dated April 27, 1976

Inventor(s) Trevor Wynne Owen

It is certified that error appears in the above-identified patent and that said Letters Patent are hereby corrected as shown below:

Column 3, line 38, "52" should read --- 53 ---.
Column 3, line 41, "50" should read --- 51 ---.
Column 3, line 68, "saddle" should read --- apron ---.
Column 5, line 8, "95" should read --- 94 ---.
Column 6, line 65, "148" should read --- 29 ---.
Column 6, line 67, "148" should read --- 29 ---.
Column 7, line 3, "148" should read --- 29 ---.
Column 7, line 7, "148" should read --- 29 ---.
Column 8, line 56, after "button" insert --- 234 ---.
Column 8, line 55, "30" to read --- 230 ---.
Column 9, line 36, "224" should read --- 39 ---.

Signed and Sealed this

Twelfth Day of April 1977

[SEAL]

*Attest:*

RUTH C. MASON
*Attesting Officer*

C. MARSHALL DANN
*Commissioner of Patents and Trademarks*